United States Patent
Goll et al.

(10) Patent No.: US 9,322,434 B2
(45) Date of Patent: Apr. 26, 2016

(54) BEARING ARRANGEMENT FOR TORQUE SENSORS HAVING SUPPORTING GUIDANCE OF THE STATOR, AND TORQUE SENSOR

(75) Inventors: Manfred Goll, Glauburg (DE); Thomas Krohn, Schwalbach (DE); Hilmar Müller, Heuchelheim (DE)

(73) Assignee: Continental Teves AG & Co. oHG (DE)

( * ) Notice: Subject to any disclaimer, the term of this patent is extended or adjusted under 35 U.S.C. 154(b) by 152 days.

(21) Appl. No.: 13/979,162

(22) PCT Filed: Jan. 12, 2012

(86) PCT No.: PCT/EP2012/050461
§ 371 (c)(1),
(2), (4) Date: Jul. 11, 2013

(87) PCT Pub. No.: WO2012/095502
PCT Pub. Date: Jul. 19, 2012

(65) Prior Publication Data
US 2013/0294715 A1 Nov. 7, 2013

(30) Foreign Application Priority Data
Jan. 12, 2011 (DE) .................. 10 2011 002 602

(51) Int. Cl.
*G01L 3/14* (2006.01)
*F16C 33/20* (2006.01)
(Continued)

(52) U.S. Cl.
CPC ............. *F16C 33/20* (2013.01); *F16C 17/10* (2013.01); *F16C 17/12* (2013.01); *F16C 43/02* (2013.01);
(Continued)

(58) Field of Classification Search
CPC ...... F16C 17/10; F16C 2326/24; F16C 23/10; F16C 17/12; F16C 33/20; F16C 43/02; F16C 41/007; F16H 57/021; B62K 21/00; B60G 2200/44; B60G 2204/418; B60R 16/027; B60R 21/203; H02K 16/04; G01L 3/101; G01L 3/10; Y10T 29/49647
USPC ..................... 384/428; 73/862.322, 862.331, 73/862.325, 862.335
See application file for complete search history.

(56) References Cited

U.S. PATENT DOCUMENTS 3,815,964 A 6/1974 Bendall
4,775,249 A 10/1988 Roemer et al.
(Continued)

FOREIGN PATENT DOCUMENTS

CN 2521243 11/2002
DE 32 30 700 3/1984
(Continued)

OTHER PUBLICATIONS

International Search Report corresponding to PCT/EP2012/050461, dated Apr. 24, 2012.
(Continued)

*Primary Examiner* — Lisa Caputo
*Assistant Examiner* — Brandi N Hopkins
(74) *Attorney, Agent, or Firm* — RatnerPrestia (57) ABSTRACT

The invention relates to a bearing arrangement, in particular for sensor arrangements, comprising a first bearing part and a second bearing part, which are designed and arranged so as to be movable relative to each other and which touch each other at least partially in the course of said relative motion. The first bearing part is guided on at least one first running surface of the second bearing part, and the first running surface of the second bearing part has a recess, in which at least one ridge is formed, wherein the arrangement of the ridge in the recess does not influence the relative motion between the first bearing part and the second bearing part.

15 Claims, 5 Drawing Sheets

(51) Int. Cl.
*F16C 17/12* (2006.01)
*G01L 3/10* (2006.01)
*F16C 17/10* (2006.01)
*F16C 43/02* (2006.01)
*F16C 41/00* (2006.01)

(52) U.S. Cl.
CPC . *G01L 3/10* (2013.01); *G01L 3/101* (2013.01); *F16C 41/007* (2013.01); *Y10T 29/49647* (2015.01)

(56) References Cited

U.S. PATENT DOCUMENTS

| | | | | |
|---|---|---|---|---|
| 5,456,536 | A | * | 10/1995 | Holmes .................. F16C 17/10 384/129 |
| 7,896,551 | B2 | * | 3/2011 | Cooley .................. E21B 4/003 384/121 |
| 7,918,693 | B2 | | 4/2011 | Thomas |
| 8,087,306 | B2 | | 1/2012 | Goll et al. |
| 2003/0081870 | A1 | | 5/2003 | Takahashi et al. |
| 2009/0224618 | A1 | * | 9/2009 | Bhatti ..................... F16C 17/10 310/90 |
| 2011/0167920 | A1 | | 7/2011 | Rink |

FOREIGN PATENT DOCUMENTS

| | | |
|---|---|---|
| DE | 38 33 556 | 5/1989 |
| DE | 296 18 885 | 3/1997 |
| DE | 10 2004 023 801 | 8/2005 |
| DE | 10 2007 059 364 | 8/2008 |
| DE | 10 2007 047 521 | 3/2009 |
| DE | 10 2007 057 292 | 6/2009 |
| DE | 10 2007 057 299 | 6/2009 |
| GB | 970392 | 9/1964 |
| GB | 2 306 586 | 7/1997 |
| WO | 2010007068 | 1/2010 |

OTHER PUBLICATIONS

German Search Report corresponding to DE 10 2012 200 437.8, dated Oct. 29, 2012.

* cited by examiner

BEARING ARRANGEMENT FOR TORQUE SENSORS HAVING SUPPORTING GUIDANCE OF THE STATOR, AND TORQUE SENSOR

CROSS REFERENCE TO RELATED APPLICATIONS

This application is the U.S. National Phase Application of PCT International Application No. PCT/EP2012/050461, filed Jan. 12, 2012, which claims priority to German Patent Application No. 10 2011 002 602.9, filed Jan. 12, 2011, the contents of such applications being incorporated by reference herein.

FIELD OF THE INVENTION

The invention relates to a bearing arrangement comprising a first bearing part and a second bearing part, which are designed and arranged so as to be movable relative to one another and which touch one another at least partially in the course of said relative motion, wherein the first bearing part is guided on at least one first running surface of the second bearing part, to a method for producing a bearing arrangement of this kind and to the use of the bearing arrangement in motor vehicles.

SUMMARY OF THE INVENTION

An aspect of the invention is a bearing arrangement in which at least a first running surface of the second bearing part has at least one ridge, due, in particular, to the integral production of the second bearing part in an injection molding/casting mold, and of designing the bearing arrangement in such a way that the relative motion between the first and the second bearing part is not influenced significantly or not at all.

The ridge is preferably a parting burr or molding flash or a mold separation fin and is formed, in particular, during the production of the second bearing part in the at least one mold parting plane, in relation to the injection mold.

The bearing arrangement is preferably designed in such a way that uniform, low-friction and low-noise operation of the bearing arrangement is made possible, even though at least the first running surface has at least one ridge. Such operation is required, for example, in a vehicle steering system, especially in the case of continuous and precise measured value determination of the raw torque signal in a torque sensor arrangement.

The first bearing part preferably has a supporting element which is only ever guided in one running surface segment, at least by the first running surface of the second bearing part. In particular, this running surface segment is dimensioned as a segment with respect to the length and/or the circumference of the respective running surface.

It is expedient if the supporting element of the first bearing part does not fully surround the first and/or second running surface of the second bearing part.

It is expedient that the depth of the recess or of the flat relative to the surface of the respective running surface or, in the case of a flat, with respect to the theoretical path of, for example, a circumferential surface, from which the flat deviates by being set back, is at least as great as or greater than the height of the ridge arranged in said recess, from the root to the tip thereof, to ensure that the supporting element or the clamp does not touch the ridge during travel over the corresponding running surface.

The bearing arrangement is preferably designed as a radial bearing, wherein the relative motion between the first and the second bearing part is a rotary relative motion.

The at least one recess in the first and/or in the second running surface is preferably designed as a flat on a cylinder circumferential surface or, alternatively, preferably as a recess of deeper design on a cylinder circumferential surface.

The term "recess" is preferably taken to mean an opening formed in a casting/injection molding process.

At least one or more or all of the recesses are preferably designed in such a way that, in relation to the cross section of the second bearing part, the first and/or the second running surface runs along a circular arc and the recess/es run along a chord of the circular arc, in particular as openings or flats on a cylinder circumferential surface.

It is preferred that the first running surface and, in particular, the second running surface are designed as circumferential surfaces of a rotationally symmetrical body. In this case, the first running surface is, in particular, designed as circumferential surfaces of a cylinder.

It is expedient that the second running surface likewise has at least one ridge and therefore likewise has a recess in the region of said ridge.

The first and/or the second running surface of the second bearing part expediently comprises two or three or more ridges, in particular molding flashes, which are arranged at uniform intervals on the running surface in a recess.

It is preferred that the second bearing part has at least one additional, second running surface along the first running surface, wherein said two running surfaces are, in particular, not arranged parallel to one another and wherein the first bearing part is guided by the first running surface and the additional, second running surface and is supported in different directions by said two running surfaces.

As a particularly preferred option, the second bearing part has a third running surface along the first and the second running surface, said surfaces each extending substantially parallel to one another and supporting the first bearing part on the second bearing part in one direction in each, that is to say in three directions in this case. As a very particularly preferred option, the first running surface is designed as a bottom track of a groove running around the second bearing part, and the second and third running surfaces each form one side wall of said groove. In this case, the supporting element of the first bearing part is expediently designed in such a way that it is pressed into said groove and thus runs along all three running surfaces with a defined force in the course of a relative motion between the first and the second bearing part. It is preferred here that the supporting element or the clamp is designed to have a spring action between the second and the third running surface, with the result, in particular, that it can be introduced into the groove and can be supported both on the second and on the third running surface.

It is preferred that the supporting element of the first bearing part runs along at least the first running surface by means of at least one sensing surface, paticularly preferably by means of two or three sensing surfaces, and is designed in such a way that the length of the sensing surface along the direction of the first running surface is greater than the length of the recess of the first running surface along the same direction, in particular that the length of the sensing surface is more than 50% longer than, particularly preferably at least twice as long as, the length of the recess, in each case along the direction of the first running surface, with the result that the supporting element of the first bearing part does not enter the recess in the first running surface as it travels along the latter.

The second bearing part is preferably designed as an injection molded plastic part or as a metal casting and is of integral design, at least along the first running surface.

It is preferred that the supporting element of the first bearing part is designed as a clamp and reaches partially around the second bearing part, at least in the region of the first running surface. In particular, the supporting element is designed as a clamp with two arms or two projecting arms and/or as a multi-part clamp and has two or more sensing surfaces, by means of which the clamp is guided and supported on the at least one running surface in respect of the relative motion between the first and the second bearing part.

It is expedient that the bearing arrangement is designed as part of a torque sensor, wherein the second bearing part is designed as a stator and the first bearing part is designed as a collector.

It is preferred that the torque sensor comprises a shaft having two shaft sections, a magnetic encoder and the stator as a second bearing part of the bearing arrangement, wherein the first shaft section and the second shaft section are connected to one another by a torsion bar and the aim is to detect the torque acting on at least one of said shaft sections, wherein the magnetic encoder is arranged on the first shaft section and the stator, which is associated with the encoder and reaches at least partially around the latter in a contactless manner and modulates the magnetic field produced by the magnetic encoder, is arranged on the second shaft section, wherein the magnetic field modulated by the stator is detected by the collector as the first bearing part of the bearing arrangement and is passed to at least one magnetic field sensor element. As a particularly preferred option, the stator comprises two stator segments of magnetically conductive material, wherein the stator segments have, in particular, fingers which each project axially relative to the torsion bar, engage alternately in one another and modulate the magnetic field and are each secured on a ring for each stator segment.

It is preferred that the two stator segments are jointly overmolded with plastic or are arranged in a common plastic carrier, wherein said overmolding or said common plastic carrier has, on the outer casing thereof, the first running surface and, in particular, the second running surface in addition.

It is expedient that the collector or the common overmolding of the collector and of a sensor module comprises/comprise a clamp, which is designed in such a way that it is designed for positive positioning and/or fixing on the outer circumference of the first and/or of the second running surface of the stator and, for this purpose, comprises at least two projecting arms.

The stator, in particular at least the first running surface thereof, is preferably made of plastic. As a particularly preferred option, the clamp is likewise made of plastic.

The clamp is preferably part of a collector.

The stator is preferably also referred to as the stator module.

The stator and the collector preferably comprise magnetic conductive elements or plates.

The collector is preferably also referred to as a collector module.

The collector preferably comprises two collector segments, which each comprise a circular segment and a bent concentrator element, wherein the two concentrator elements are designed and arranged in such way that they form at least one joint air gap between them, in which at least one recess is arranged to accommodate at least one magnetic field sensor element. In particular, the two concentrator elements of the collector module are at least partially overmolded, wherein the at least one recess is formed in the air gap between the two concentrator elements of the collectors in the plastic housing of this common overmolding.

At the point or in the region of this at least one parting burr, the first running surface is preferably flattened or set back or has a recess, thus ensuring that the clamp, in particular the sensing surface thereof, does not touch the parting burr as it travels along the running surface.

The second running surface is expediently designed as a supporting surface which is substantially perpendicular to the first running surface, the latter being formed, in particular, on a cylinder circumferential surface, and which likewise has at least one ridge and therefore likewise has a recess in this region. The clamp thus travels over, in particular, a circumferential surface and a lateral supporting surface as the first and second running surfaces and supports the collector relative to the stator in two directions and offers corresponding guidance.

With respect to the axial direction of the shaft of the torque sensor, the at least one recess on the first running surface and/or on the second and/or third running surface is preferably formed obliquely. In this case, the recess particularly preferably has a substantially rectangular or trapezoidal bottom surface, the center line of which is not perpendicular, i.e. is oblique, with respect to the direction along the running surface.

The torque sensor is preferably designed in such a way that the stator is embodied integrally, but having two segments, at least on the first running surface thereof, as regards its production process by injection molding, leading to ridge formation or a parting burr or molding flash (offset by 180°) on the first running surface and hence to a discernible transition. As a particularly preferred option, the running surface of the stator consists of three segments (offset by 120°) at this point. In the region of ridge formation, the first running surface is set back by means of flats or respective recesses. The maximum permissible height of the parting burr or molding flash is defined by means of the depth of the recess or flat in comparison with the theoretical continuation of the cylinder circumferential surface. The flats are covered since the bearing surfaces or sensing surfaces of the clamp are larger (at three points) than the flats or recesses on the first running surface and are therefore "overrun".

The invention furthermore relates to the production of the bearing arrangement and to the use of the bearing arrangement in motor vehicles, especially in sensor arrangements.

Moreover, the invention relates to a torque sensor arrangement.

BRIEF DESCRIPTION OF THE DRAWINGS

The invention is best understood from the following detailed description when read in connection with the accompanying drawings. Included in the drawings is the followigure figures.

DETAILED DESCRIPTION OF THE PREFERRED EMBODIMENTS

Figure 1:
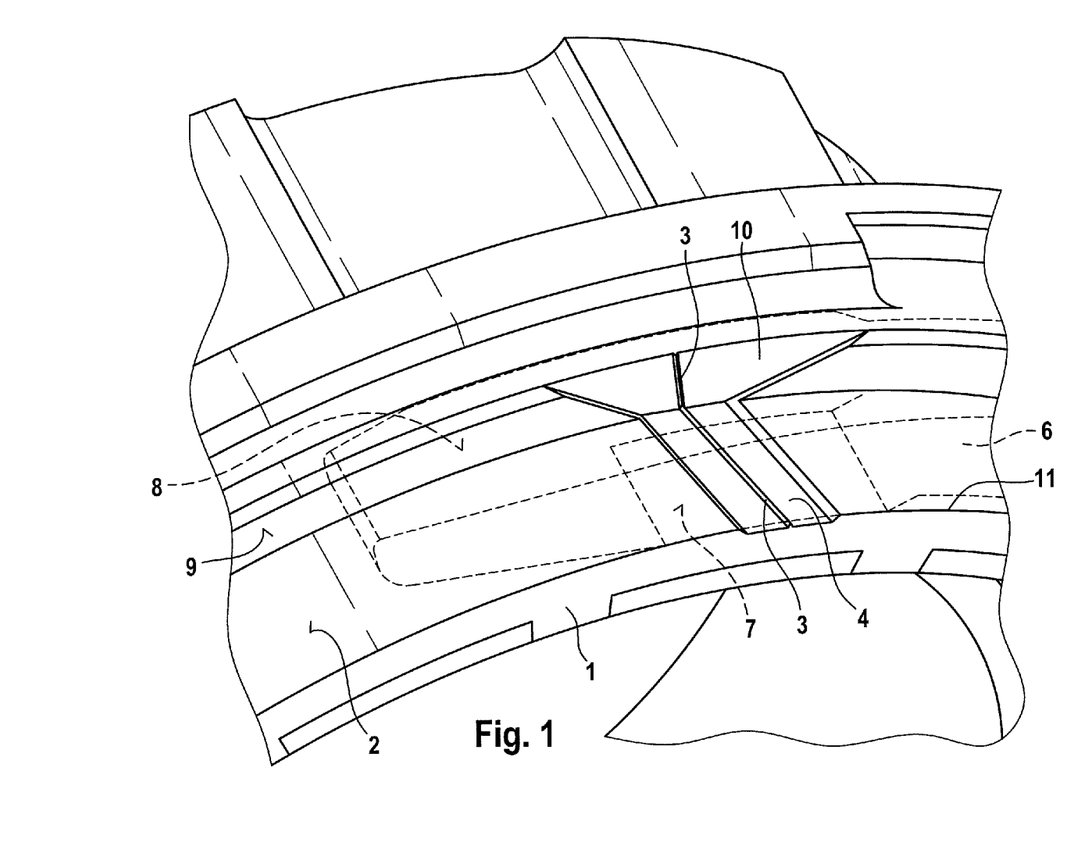
FIG. 1 shows an embodiment example of the bearing arrangement in which the clamp of the collector or first bearing part is shown traveling over the first running surface of the stator in a three dimensional view.

FIG. 1 shows stator 1 with its first running surface 2, which has a molding flash or parting burr 3 within the visible segment. In the region of this molding flash 3, a recess 4 is formed on the first running surface 2, beyond which the molding flash 3 does not project. The sensing surface 7 of the clamp 6 travels over the first running surface 2 in contact therewith. At the same time, according to the example, a second, lateral sensing surface 8 thereof also travels over a lateral supporting surface 9 as a second running surface, which likewise has the molding flash 3. A recess 10, in which molding flash 3 is arranged, is likewise let into second running surface 9.

The recesses 4 and 10 are formed with a slight obliquity relative to the first running surface 2 and to the second running surface 9. Sensing surface 7 and the lateral sensing surface 8 are designed to be longer than the associated recesses 4 and 10 along the running surfaces 2 and 9, in relation to the encircling line 11, being designed as an arc around the circumferential surface. The sensing surfaces 7 and 8 of the clamp 6 therefore do not enter the recesses 4 and 10, thereby ensuring that the relative motion between the stator 2 and the clamp 6, as the second and first bearing parts, is not significantly influenced by the ridge or the recesses.

Figure 2:
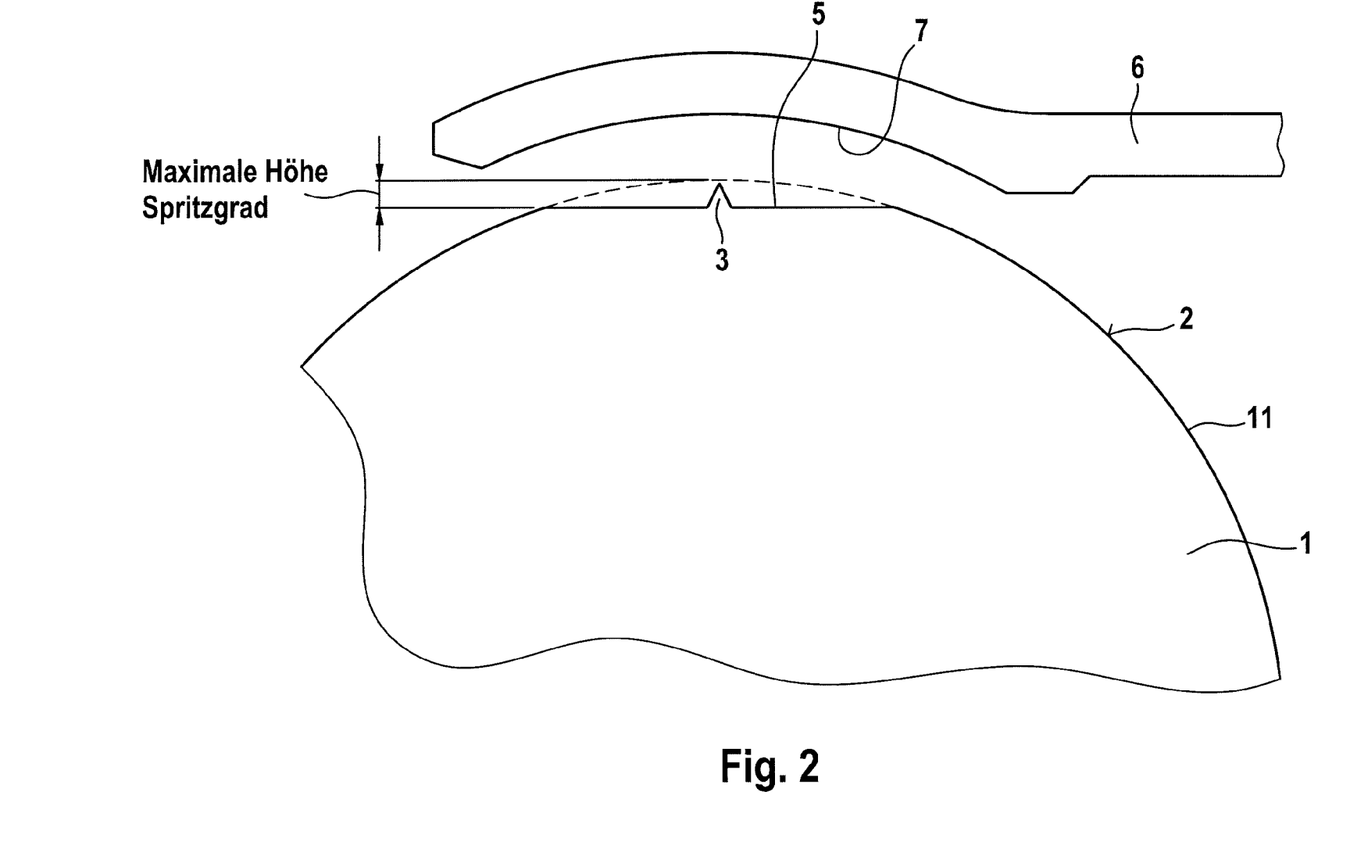
FIG. 2 shows the clamp above the first running surface by way of example, in a side view.

FIG. 2 shows the arrangement of stator 1, as the second bearing part, and clamp 6 of the collector, as the first bearing part, from a side view. For greater clarity, clamp 6 is here shown separated from stator 1 by an air gap, but this does not correspond to the actual arrangement, in which clamp 6 rests on and is supported by sensing surface 7 on the first running surface 2 of the stator. Ridge 3 is arranged in flat 5 on the first running surface 2. In this case, said running surface 2 is a circumferential surface of a cylindrical part or segment of the stator 1. In this case, the flat 5 is set back so far from the theoretical path of the ideal circular line 11 along which clamp 6 travels that ridge 3 disappears therein. Ridge 3 thus has a height less than the maximum height resulting from the distance between the bottom surface of the flat and the theoretical path of the ideal circular line 11. Of course, this distance depends on the position within the flat. According to the example, the design of the injection mold is chosen in such a way that the boundary between the mold parts at which the ridge forms is substantially in the center or in a central region of the recess or flat, which are, in turn, formed or shaped by the mold parts of the injection mold.

In the examples presented, the second bearing part or stator 1 is thus always formed in such a way that the ridge is substantially in the center or in a central region of the recess or flat.

Figure 3:
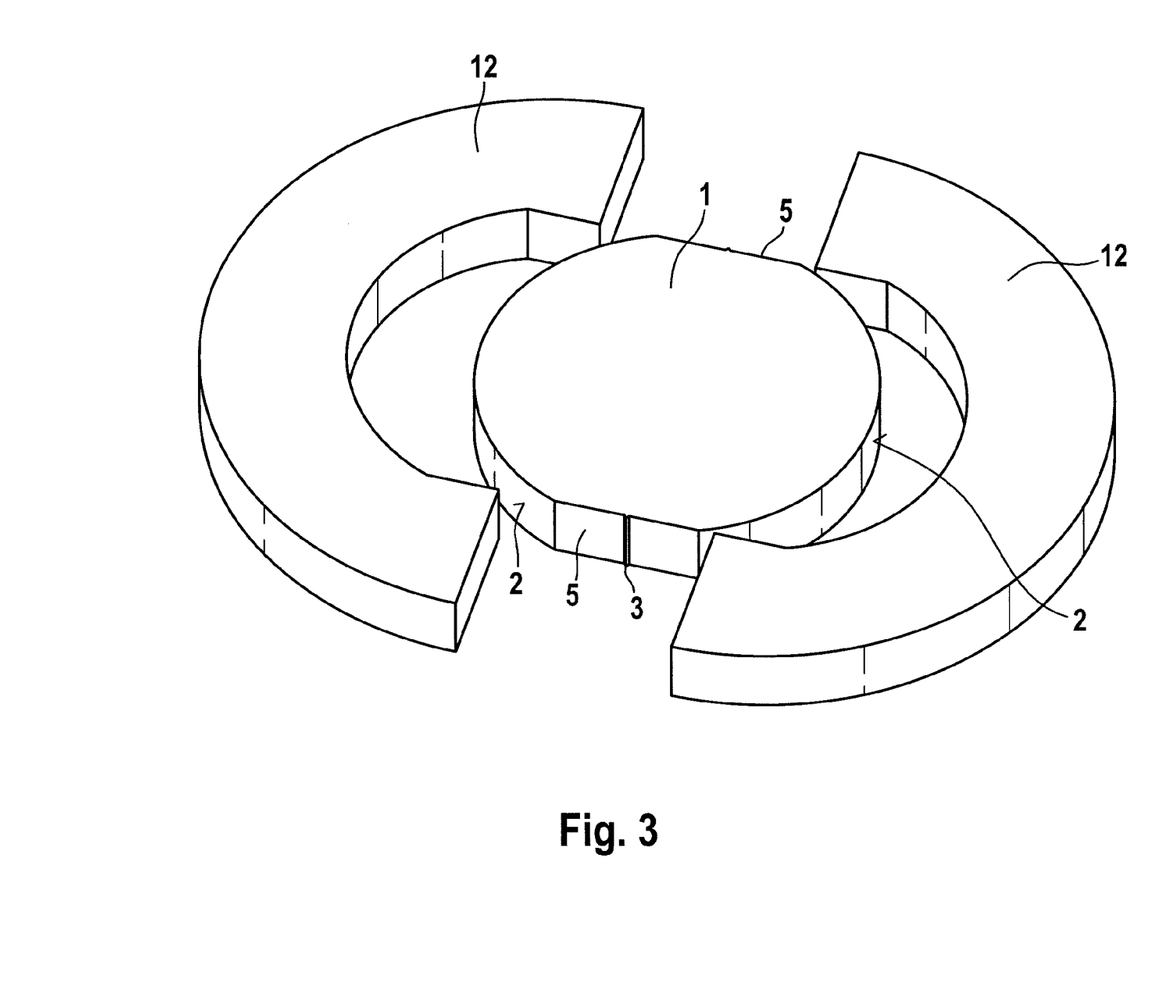
FIG. 3 shows the second bearing part with the first running surface thereof, resulting, by way of example, from the shaping by a two-part injection mold.

The shaping of a stator 1 by means of a two-part injection mold 12 is illustrated by means of FIG. 3. Flats 5 are in each case formed as recesses on the first running surface 2 at the boundaries of the mold halves, in the central region of which recesses there is in each case or there is formed in each case ridge 3 as molding flash. It is thus possible for just one clamp (not shown) as a supporting element to travel over the first running surface 2, i.e. it can be guided and supported by said running surface, without being influenced by the ridge 3 or flats 5 as long as the length of the sensing surface thereof, which, in this case, as in most examples, is of curved design, is greater than the length of the flat along the running surface 2.

Figure 4:
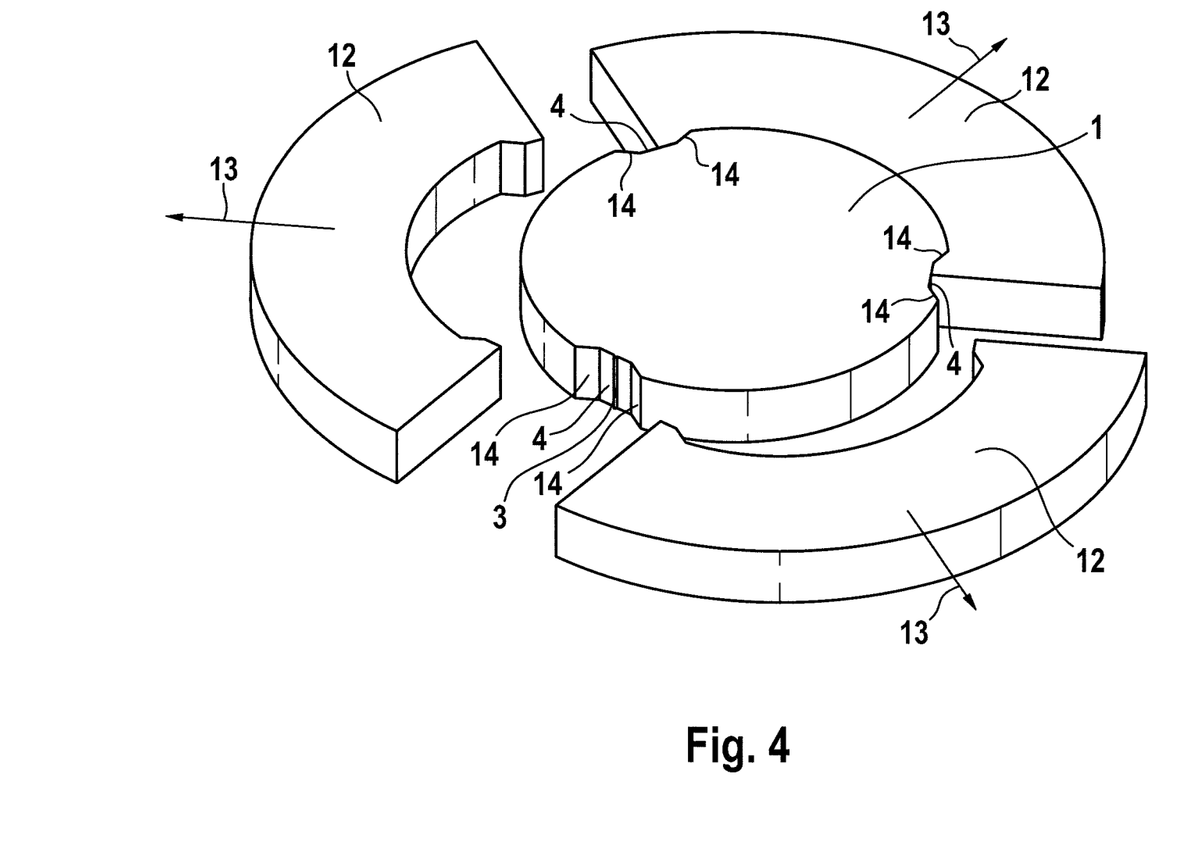
FIG. 4 shows the second bearing part, resulting according to the example from a three-part injection mold.

FIG. 4 shows stator 1 produced with a three-part injection mold 12. A recess 4 is formed at each of the boundaries of the three mold parts, said recess comprising not just a flat but also a kind of oblique notch 14 or oblique partial notch surface 14, on both sides as an edge surface of the recess 4 in the direction along the running surface 2. According to the example, said partial notch surfaces 14, formed by the injection mold parts 12, are each formed perpendicularly to the opening direction 13 of the respective mold parts 12, i.e. the surface normal of the respective partial notch surface 14 is substantially parallel to the opening direction 13 of the associated mold part 12. Ridge or molding flash 3 is in each case arranged in the center of the recesses 4.

Figure 5:
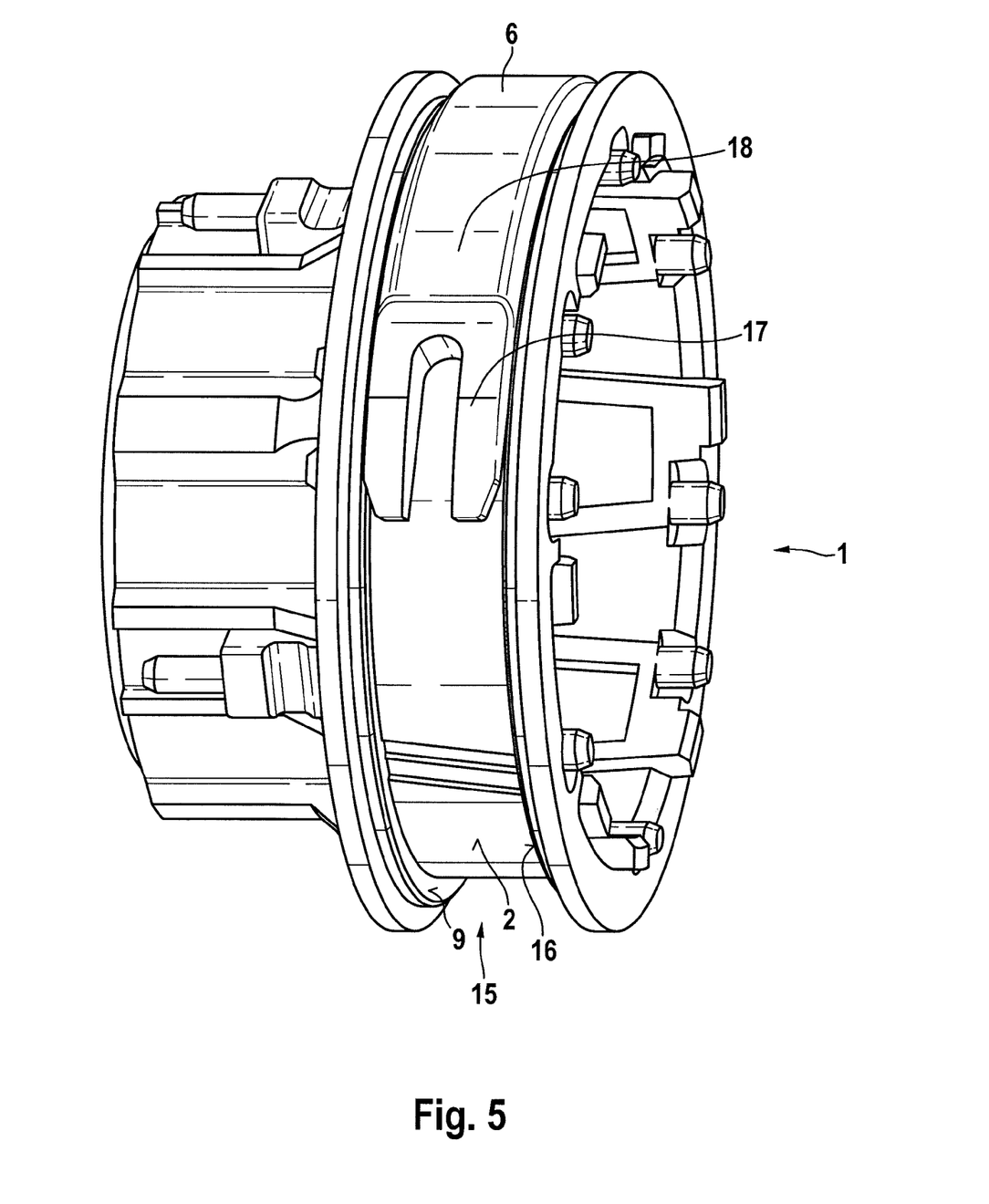
FIG. 5 shows an embodiment example of the second bearing part as a stator of a torque sensor arrangement, wherein three running surfaces are formed in a groove.

Stator 1 of a torque sensor as a second bearing part is shown by means of FIG. 5, having a groove 15 on the outer surface thereof. This groove comprises a bottom or base surface as a first running surface 2 and two side faces as second running surface 9 and third running surface 16. Clamp 6 is supported and guided on said three running surfaces, for which purpose each running surface is assigned a sensing surface and clamp 6 is designed to be flexible in the direction of the surface normal of the second and third running surfaces 9 and 16 by virtue of spring element 17. Clamp 6 has all three sensing surfaces in the region of spring element 17. Spring element 17 is pressed into groove 15, thereby allowing guidance and support on all three running surfaces 2, 9 and 16. Clamp 6 comprises two arms 18, of which just one is shown, the other being situated on the other side of the clamp 6. Spring element 17, which has the three sensing surfaces, is formed at the end of each of the two arms 18.

The invention claimed is:

1. A bearing arrangement for sensor arrangements, comprising:
   a first bearing part and a second bearing part, which are movable relative to one another and which touch one another at least partially in the course of said relative motion,
   wherein the first bearing part travels over and is guided on at least one first running surface of the second bearing part,
   wherein the first running surface of the second bearing part has a recess extending obliquely with respect to a longitudinal axis of the second bearing part, in which at least one ridge is formed, and
   wherein the arrangement of the ridge in the recess does not influence the relative motion between the first bearing part and the second bearing part.

2. The bearing arrangement as claimed in claim 1, wherein the first bearing part has a supporting element which is only ever guided in one running surface segment, at least by the first running surface of the second bearing part.

3. The bearing arrangement as claimed in claim 2, wherein the supporting element of the first bearing part runs along at least the first running surface by at least one sensing surface, and the length of the sensing surface along the direction of the first running surface is greater than the length of the recess of the first running surface along the same direction, and the length of the sensing surface is more than 50% longer than the length of the recess, in each case along the direction of the first running surface, such that the supporting element of the first bearing part does not enter the recess in the first running surface as it travels along the latter.

4. The bearing arrangement as claimed in claim 2, wherein the supporting element of the first bearing part is a clamp and reaches partially around the second bearing part, at least in the region of the first running surface.

5. The bearing arrangement as claimed in claim 1, wherein the second bearing part has at least one additional, second running surface along the first running surface,
wherein said two running surfaces are not arranged parallel to one another, and
wherein the first bearing part is guided by the first running surface and the additional, second running surface and is supported in different directions by said two running surfaces.

6. The bearing arrangement as claimed in claim 1, wherein the first running surface and the second running surface are circumferential surfaces of a rotationally symmetrical body.

7. The bearing arrangement as claimed in claim 5, wherein the second running surface likewise has at least one ridge and therefore likewise has a recess in the region of said ridge.

8. The bearing arrangement as claimed in claim 1, wherein at least the second bearing part is an injection molded plastic part or a metal casting and is of integral design, at least along the first running surface.

9. The bearing arrangement as claimed in claim 1, wherein said bearing arrangement is part of a torque sensor, and
wherein the second bearing part is designed as a stator and the first bearing part is designed as a collector.

10. The bearing arrangement as claimed in claim 9, wherein the torque sensor comprises a shaft having two shaft sections, a magnetic encoder and the stator as a second bearing part of the bearing arrangement,
wherein the first shaft section and the second shaft section are connected to one another by a torsion bar and the aim is to detect the torque acting on at least one of said shaft sections,
wherein the magnetic encoder is arranged on the first shaft section and the stator, which is associated with the encoder and reaches at least partially around the latter in a contactless manner and modulates the magnetic field produced by the magnetic encoder, is arranged on the second shaft section,
wherein the magnetic field modulated by the stator is detected by the collector as the first bearing part of the bearing arrangement and is passed to at least one magnetic field sensor element.

11. The bearing arrangement as claimed in claim 9, wherein the collector or the common overmolding of the collector and of a sensor module comprises/comprise a clamp, which is configured for positive positioning and/or fixing on the outer circumference of the first and/or of the second running surface of the stator and, for this purpose, comprises at least two projecting arms.

12. The bearing arrangement as claimed in claim 10, wherein the stator comprises two stator segments of magnetically conductive material,
wherein the stator segments have fingers which each project axially relative to the torsion bar, engage alternately in one another and modulate the magnetic field and are each secured on a ring for each stator segment.

13. The bearing arrangement as claimed in claim 12, wherein the two stator segments are jointly overmolded with plastic or are arranged in a common plastic carrier, and
wherein said overmolding or said common plastic carrier has, on the outer casing thereof, the first running surface and the second running surface in addition.

14. A method for producing a bearing arrangement as claimed in claim 1.

15. The use of the bearing arrangement as claimed in claim 1 in motor vehicles, in sensor arrangements.

* * * * *